United States Patent [19]

O'Meara

[11] 4,129,775

[45] Dec. 12, 1978

[54] GLINT CAPTURE SYSTEM FOR IMPROVING LOCK STABILITY OF COAT

[75] Inventor: Thomas R. O'Meara, Malibu, Calif.

[73] Assignee: Hughes Aircraft Company, Culver City, Calif.

[21] Appl. No.: 801,897

[22] Filed: May 31, 1977

[51] Int. Cl.² .............................................. G01J 1/20
[52] U.S. Cl. ................................ 250/203 R; 244/176; 356/152
[58] Field of Search ............................... 244/171, 176; 250/203 R; 356/5, 152

[56] References Cited

U.S. PATENT DOCUMENTS

| 3,268,185 | 8/1966 | Eckermann, Jr. | 244/176 |
| 3,286,953 | 11/1966 | Meisenholder | 244/171 |
| 4,020,340 | 4/1977 | Cooke | 250/203 R |

OTHER PUBLICATIONS

Coldrick – "Optical Sensors for Spacecraft Attitude Determination – *Optics & Laser Technology*, pp. 129–141; Jun. 1972.

*Primary Examiner*—Lawrence J. Dahl
*Attorney, Agent, or Firm*—Lawrence V. Link, Jr.; W. H. MacAllister

[57] ABSTRACT

An imaging detector system for improving the lock-on stability of an optical system and in particular a multi-dither coat system. A quadrant non-coherent detector is disposed beneath a variable stop iris for receiving focused light from a target. The quadrant detector generates a signal in each quadrant sensor region which has a value proportional to the intensity of the light impinging on that sensor region. The signals so generated are processed in a signal processor to generate x-y steering command signals which drive a motor which in turn drives a slewing mirror so that the area of the quadrant detector upon which the greatest light intensity occurs is centered relative to the iris aperture when viewed in the direction of the return optical energy. When the high-intensity region is centered, the aperture of the variable stop iris is decreased to prevent the problem of glint jump.

12 Claims, 13 Drawing Figures

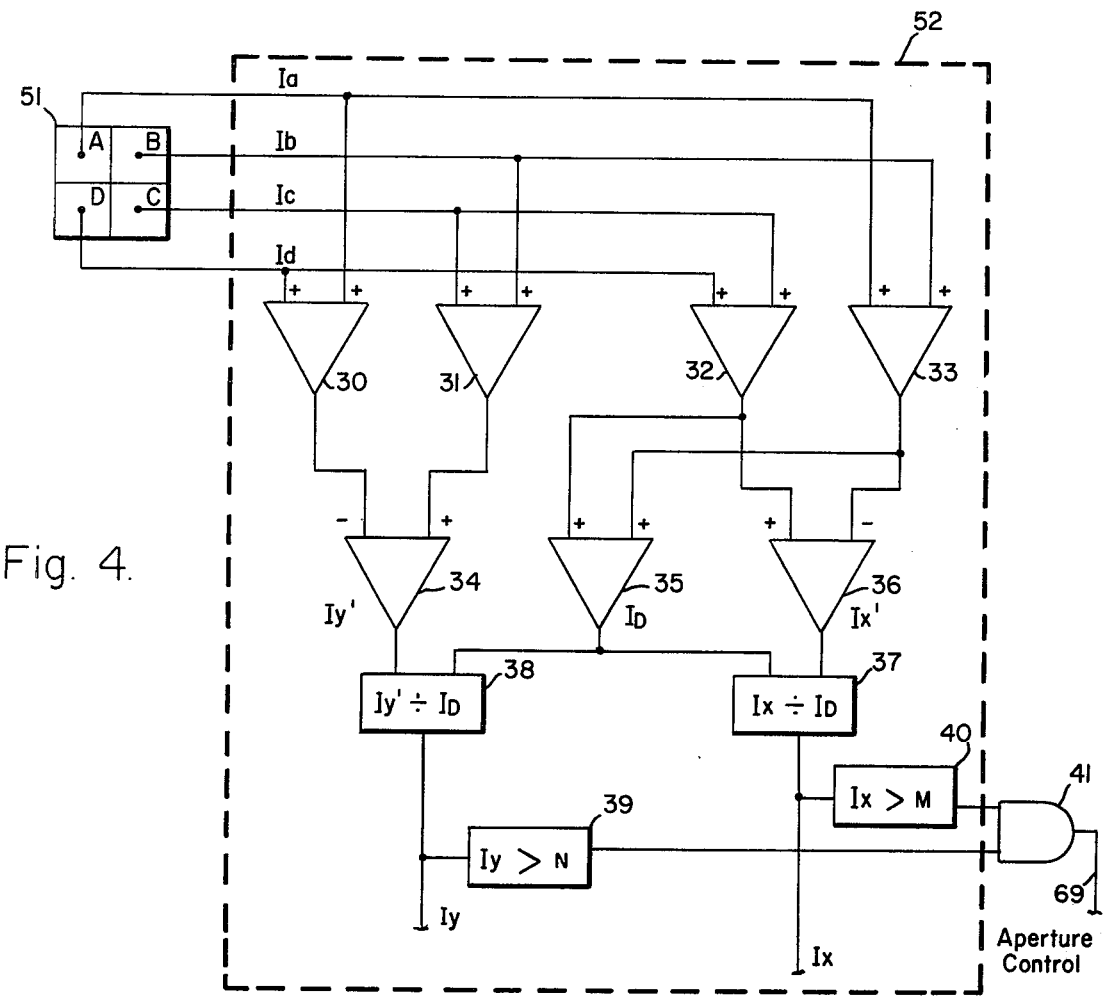

GLINT CAPTURE SYSTEM FOR IMPROVING LOCK STABILITY OF COAT

BACKGROUND OF THE INVENTION

The invention herein described was made in the course of or under a contract or subcontract thereunder, (or grant) with the Department of the Air Force.

Scope of the Invention

This invention relates to optical systems and in particular to multi-dither COAT systems with fully automatic means for mitigating the glint jump problem to thereby improve lock-on stability.

Prior Art

Coherent optical adaptive techniques (COAT) systems have been devised over the past years to compensate for phase distortions in the transmission path (COAT) and in the reception path (I-COAT) of a defraction limited light beam. These phased distortions arise from a number of factors including atmospheric turbulence, thermal blooming, laser medium phase distortions, optical train errors and distortions, and pointing and tracking jitter just to name a few. COAt and I-COAT systems provide a tecnique for detecting these phase distortions automatically in real time and then apply a conjugate phase distortion to the particular beam wavefront in question so that the net result after propagation through the transmission and/or return paths is a diffraction limited wavefront even for time varying distortions. Thus, the phase of the plurality of beams illuminating a target or received from a target is controlled so that the beams are substantially in phase at the target in COAT systems and in phase at the detector in I-COAT systems.

Many types of COAT systems have been devised including the phase conjugate system, the imaging COAT system, and the multi-dither outgoing wave system. For a complete explanation of the COAT concept and basic COAT systems see "Compensation of progagation Distortions Using Coherent Optical Adaptive Techniques (COAT)" by James E. Pearson, *Optical Engineering*, March/April 1976 at page 151, and "Coherent Optical Adaptive Techniques: Design and Performance of an Eighteen Element Visible Multi-Dither COAT System," by J. E. Pearson et al, *Applied Optics*, March 1976, vol. 15, at page 611. In addition, various COAT systems and techniques are disclosed in the following patents:

U.S. Pat. No. 3,731,103, O'Meara, filed Feb. 24, 1971,
U.S. Pat. No. 3,764,213, O'Meara, filed May 8, 1972,
U.S. Pat. No. 3,988,608, O'Meara, filed June 24, 1974.

While these systems operate to effectively minimize phase front distortions due to the aforementioned conditions, such systems have the property when employing detectors which average over the reflected power incident at the receiver aperture, that they either converge the beam on the brightest glint (in the normal control mode) or the "blackest hole" (in the inverted control mode). One characteristic of converging the beam in this manner, particularly when dynamic targets are involved, is that the relative strength of the glint distributions will change in time. Thus, sudden and drastic changes in the point of beam formation frequently occur. When such sudden and drastic changes, i.e., glint jumps, occur the value of a COAT system can be greatly reduced in many applications.

It is thus the primary object of the present invention to provide an automatic means for mitigating the glint jump problem.

It is yet another object of the present invention to provide a system which can appreciably improve the lock-on stability of a multi-dither COAT system.

It is still another object of the present invention to identify an aim point area, e.g., maximum glint return, and to center that aim point on an optical detector and thereafter to reduce the aperture of an iris to eliminate the optical return from glint regions which may subsequently increase in glint intensity.

SUMMARY OF THE INVENTION

In one embodiment of a COAT system incorporating apparatus for minimizing the glint jump problem, a quadrant non-coherent detector which is of comparable size to the defraction limited spot size of an element pattern of the COAT system, is interposed below a variable stop iris which is centered on the detector and which is capable of being stopped down to an aperture size preferably somewhat larger than the diffraction limited spot size of the receiver aperture. The variable stop iris and quadrant non-coherent detector combination is placed in the optical return path from a target identified by either an imaging COAT system such as that disclosed in the U.S. Pat. No. 3,980,879, filed June 24, 1974, or in an active COAT system such as the multi-dither COAT system disclosed in an article entitled, "Coherent Optical Adaptive Techniques: Design and Performance of an Eighteen Element Visible Multi-Dither COAT System" Disclosed in *Applied Optics*, March 1976, at page 611. In the augmented COAT system as extended by the present invention, the quadrant detector is optically boresighted with the geometric axis of the array. the quadrant detector then generates four signals having values proportional to the intensity of the light incident on the individual regions of the quadrant detector. The signals from the quadrant detector are processed to generate x-y command signals which operate to redirect the optical return energy received from a target and thus move the centroid of the image intensity distribution to the center of the detector by either redirecting the coherent light source itself or preferably by driving a slewing mirror.

Consequently, the centroid of the image intensity distribution shifts as the quadrant detector redirects the optical axis to essentially center the image of the dominant glint on the detector. This not only enhances the illuminating power on the selected glint but also enhances the lock stability since the effective reflectivity of the dominant glint increases relative to other glints. This enhancement occurs because COAT systems are biased toward glints which fall on the optical axis since this places them at the peak of the element pattern intensity distribution.

Once the dominant glint is centered, means are provided to decrease the iris aperture such that the detector is effectively decoupled from any other glints previously incident upon the guadrant detector.

The above-described system may be employed in different ways. For example, it may be desirable to choose a lesser glint for an aim point by centering the weaker glint (for example, manually) on the detector and thereafter closing the variable stop iris aperture down on the lesser intensity glint.

BRIEF DESCRIPTION OF THE DRAWINGS

The novel features of this invention as well as the invention itself will be better understood from the accompanying description taken in connection with the accompanying drawings in which the reference characters refer to like parts and in which:

FIG. 4 is a detailed representation of one possible embodiment of the control electronics of FIG. 3.

FIG. 6 is a partial block diagram illustrating an alternative embodiment of the present invention using two iris stops and two detectors.

DETAILED DESCRIPTION OF THE PREFERRED EMBODIMENTS

Figure 1:
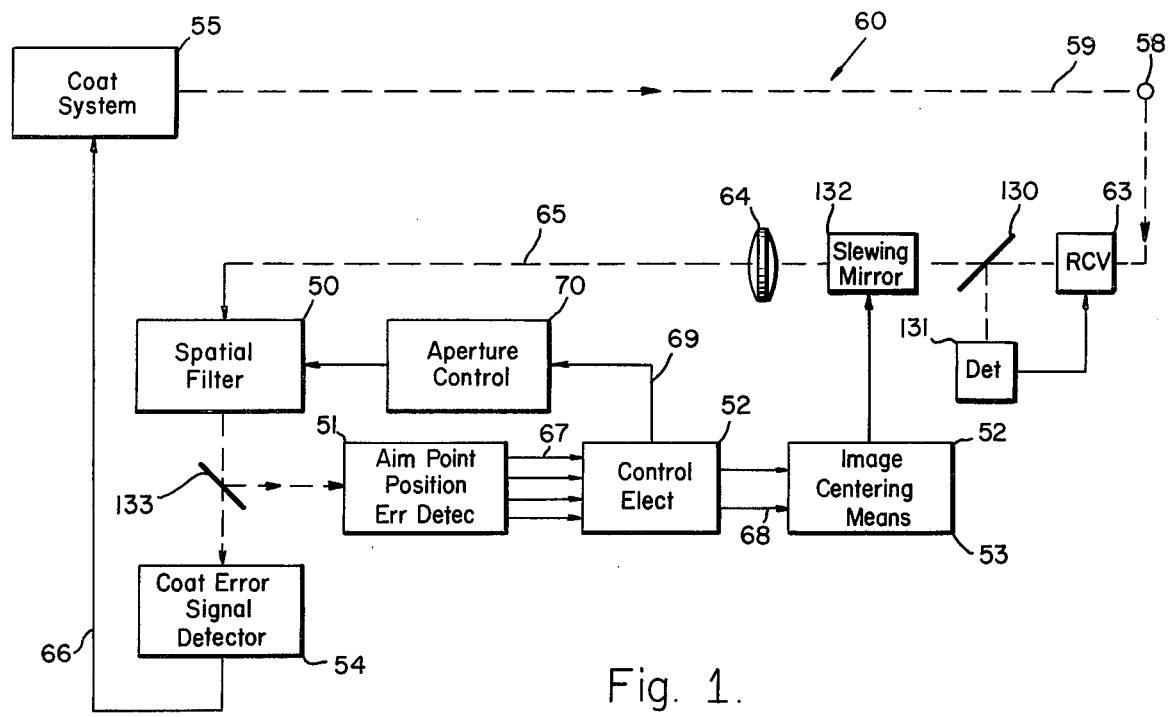
FIG. 1 represents a generalized block diagram of the present invention.

Referring first to FIG. 1, there is shown a generalized block diagram 60 illustrating the major functional components of the present invention. Thus, a COAT system 55 is adapted to transmit coherent optical energy 59 to target 58. COAT system 55 may be any system which utilizes phase modulations or deformable mirrors to compensate and cancel phase distortions in the transmission path 59 or return path 62 as disclosed in U.S. Pat. No. 3,731,103, filed Feb. 24, 1971, or disclosed in the article entitled "Compensation of Propagation Distortions Using Coherent Optical Adaptive Techniques (COAT)" by James E. Pearson, supra, or in the article entitled, "Coherent Optical Adaptive Techniques: Design and Performance of an Eighteen-Element Visible Multi-Dither COATS System," supra. Coherent light from COAT system 55 travels along path 59 to target 58. Optical return energy travels along path 62 where it is received by optical receiver apparatus 63 which may include receive apertures, focusing optics such as telescopes, phase shifting means for I-COAT augmentation and any other convenient apparatus to aid in receiving. The optical energy received may also be processed in an imaging COAT system 57 such as the one disclosed in U.S. Pat. No. 3,764,213 filed May 8, 1972, whereby distortions occurring in the return path 62 may be detected and corrected by appropriate phase shifting elements in the optical path. It will be understood, of course, that the present invention may be utilized in conjunction with either a COAT system, an imaging COAT system or a combination system using both COAT and imaging COAT processing. If an imaging COAT system is incorportated, the beam splitter 130 and I-COAT error signal detector 131 will preferably be coupled in a feedback path in accordance with the teachings of the above-identified references.

Optical return energy 62 is next directed by slewing mirror 132, which may be any optical energy directing and positioning means, in response to signals from image centering means 53 to direct the optical energy to a defined point. Optical energy then passes through focusing lens 64, impinges upon spatial filter 50, and is detected by COAT error signal detector 54. Detector 54 produces wavefront error control signal 66 which is utilized by COAT system 55 to provide the appropriate phase front corrections required by COAT systems. The optical energy from spatial filter 50 is also directed, for example by beam splitter 133, to aim point position error detector 51 which provides a means for selecting a particular aim point or glint in the field of view below the spatial filter and generating appropriate detector signals 67 which identify the location of the selected aim point position relative to a defined reference location such as the center of the detector. Control electronics 52 processes detector signals 67 to generate control signals 68 which are coupled to imaging centering means 53 to command appropriate servo electronics to change the position of slewing mirror and thereby change the direction of optical path 65. In so doing, the particular aim point selected may be positioned in coincidence with the defined reference positioning, e.g., centered, relative to the aperture of spatial filter 50. Control electronics 52 also provides a control signal 69 to spatial filter aperture control means 70 whereby the aperture of spatial filter 50 is decreased when, for example, the control signals 68 from control electronics 52 are less than a defined level thereby indicating that the aim point is at the center of the spatial filter aperture.

Thus, even with a plurality of possible aim points (generally characterized as glints) imaged on a spatial filter aperture, a particular aim point or glint may be selected, moved to the center of a detector and the aperture of the spatial filter decreased to block out the optical return from other possible glints.

Figure 2:
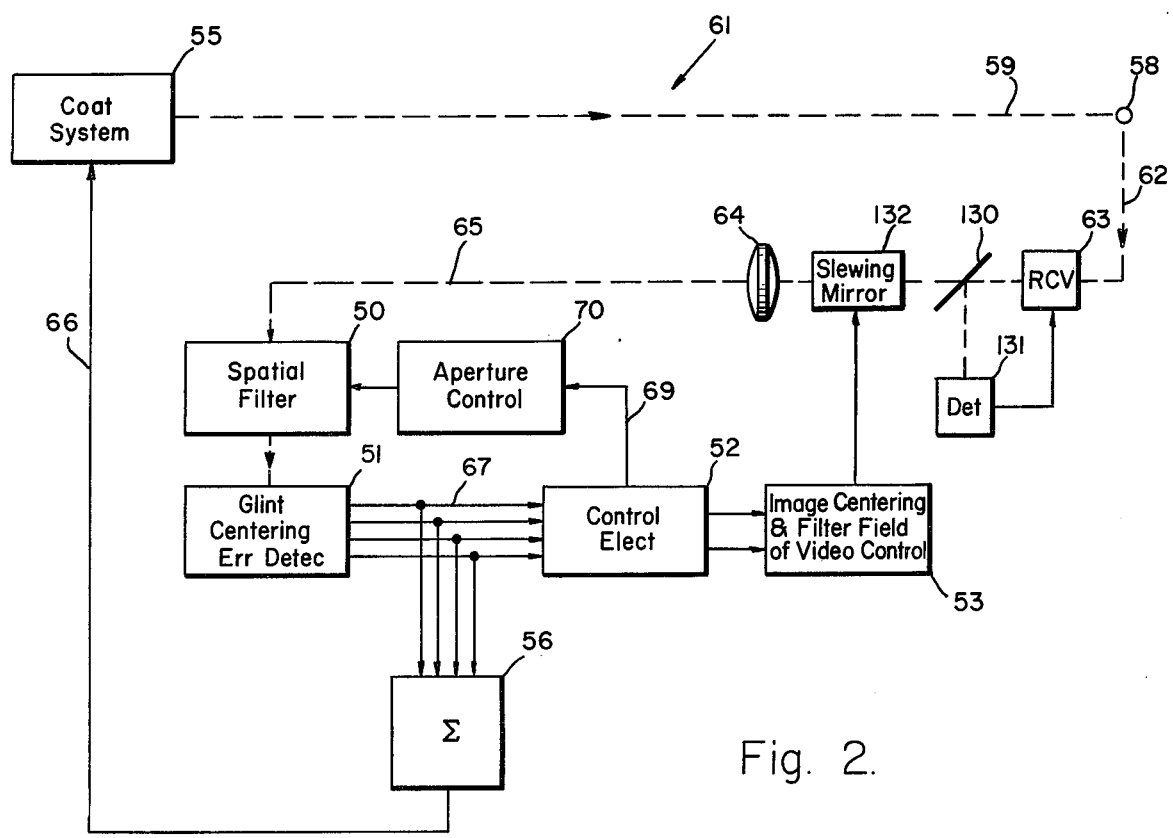
FIG. 2 is a block diagram of an alternate embodiment of the present invention more specifically shown in FIG. 3.

An alternative arrangement for the present invention is disclosed in FIG. 2 where COAT error signal detector 54 of FIG. 1 has been eliminated. This variation takes the detector signals 67 from aim point position error detector 51 and combines them in summing means 56 to form a wavefront error control signal on lead 66 for the transmitter of COAT system 55. In all other respects, the two systems may be the same.

Figure 3:
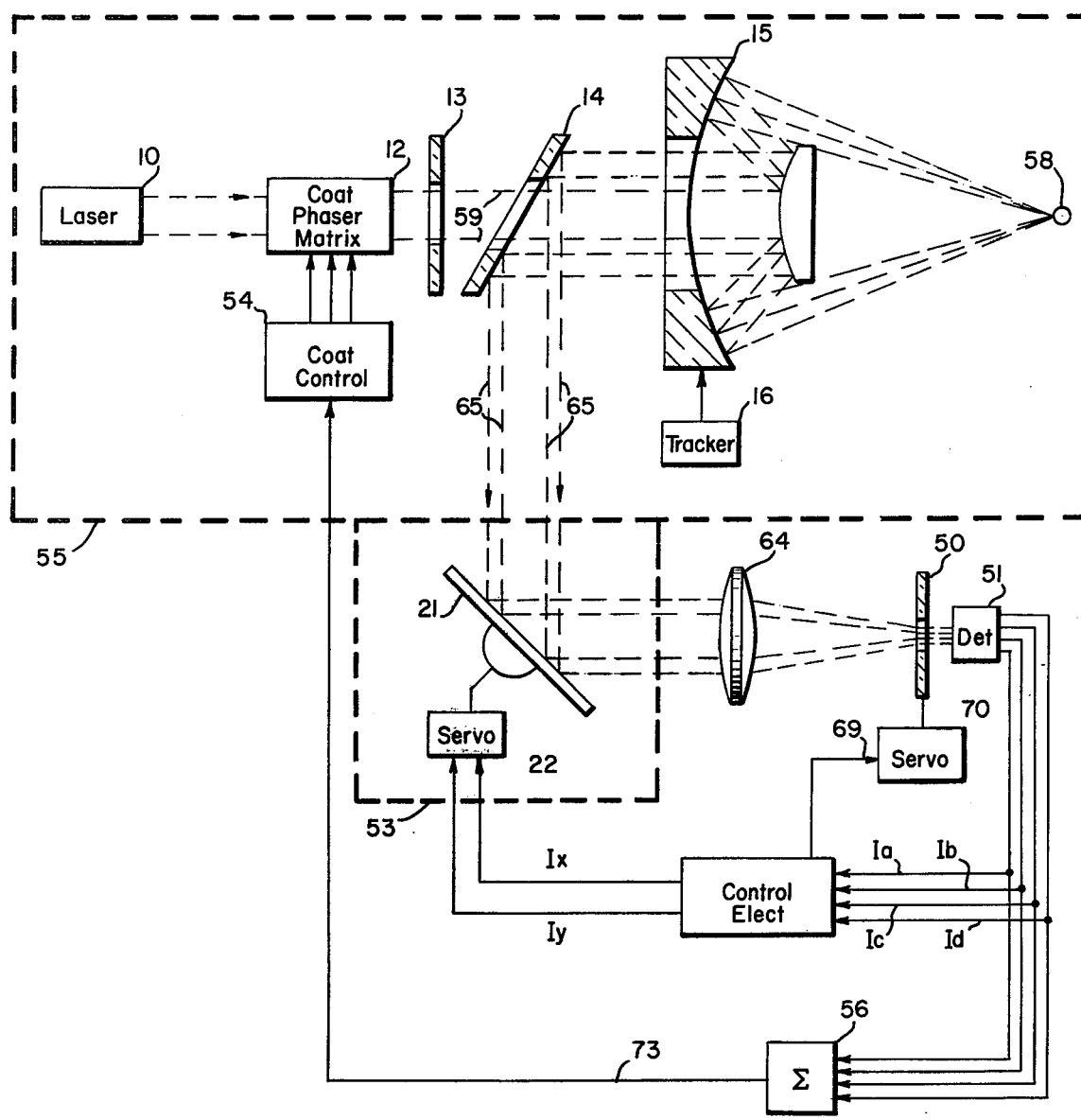
FIG. 3 is a detailed block diagram illustrating the present invention in a multi-dither COAT system in which the maximum glint intensity is tracked.

Referring to FIG. 3, a preferred mechanization of the system described in conjunction with FIG. 2 is disclosed. Basic COAT system 55 comprises laser 10 for generating a laser beam 18 which may be phase shifted by varying amounts in COAT phaser matrix 12 to thereby impress the phase conjugate of the transmission path phase distortion onto the transmitted wavefront. COAT phaser matrix 12 may be a deformable mirror or any other pre-distorting wavefront means such as those described in the aforementioned March 1976, article in *Applied Optics* entitled "Coherent Optical Adaptive Techniques: Design and Performance of an Eighteen Element Visible Multi-Dither COAT System." The pre-distorted phase conjugate light signal 59 passes through optical filter 13 which prevents any reflection off of the surface of shearing mirror 14 and assures isolation between the transmitted beams and the received optical energy. The phase conjugate light beam is then transmitted from telescope 15 to target 58. The output phase conjugate light beam may be directed to target 58 by any conventional tracking means such as tracker 16, shown coupled to telecsope 15 by way of illustration only, which may be a separate radar system or infrared system of any other of a number of well known systems for tracking stationary or moving targets.

In the present embodiment, the signals returning from target 58 are received by telescope 15 although a separate receiving telescope may be provided. The optical return energy 65 is then reflected off shearing mirror 14. Shearing mirror may be any type mirrored surface and is preferably placed at a 45° angle to the direction of the return path to reflect the optical return energy into a path perpendicular to the path of the output phase conjugate light beam as shown. Shearing mirror 14 may, for example, be a mirrored surface with an oval aperture which appears to be circular when viewed in the direction of a phase conjugate transmitted light beam 59.

The received optical energy 65 is reflected from shearing mirror 14 to image centering means 53. In the illustrated embodiment, image centering means may include a slewing mirror 21 which moves in two dimensions in response to servo motor 22 mechanically coupled thereto. The optical return energy 65 reflected from slewing mirror 21 passes through focusing element 64, variable stop iris 50 and is detected by detector 51 which in the present example is a quadrant detector well known in the art.

Referring momentarily to FIG. 4, quadrant detector 51 is shown comprising four detector regions, A, B, C and D. Each detector region integrates the total light incident on that region to produce a composite signal having a magnitude proportional to the integrated light intensity over the surface of that detector region. Thus, detector signal $I_a$ is proportional to the light energy falling on detector quadrant region A with electrical signals $I_b$, $I_c$ and $I_d$ similarly proportional to the integrated light intensity on regions B, C and D respectively. Referring again to FIG. 3, the electrical signals $I_a$, $I_b$, $I_c$ and $I_d$ are combined in control electronics 52 to produce a signal $I_x$ which is coupled to servo 22 to drive slewing mirror 21 and direct the point of focus of the optical return energy 65 in the x coordinate direction of detector 51. Control electronics 52 also combine the aforementioned signals from quadrant detector 51 to form a second signal $I_y$ which is coupled to servo 22 to drive slewing mirror 21 and direct the point of focus of the optical return energy in the x-y coordinate direction of detector 51.

Control electronics 52 also utilizes the signals from quadrant detector 51 to produce an aperture control signal 69 which drives aperture servo means 70 to decrease the aperture of variable stop iris 50. The variable stop iris 50 and aperture control means 70 which combine to allow variations in the size of the spatial filter aperture are well known in the art and may be for example the iris #22-3511 made by Ealing Company. Of course, it will be appreciated that any means of decreasing the aperture of spatial filter 50 once the chosen glint is centered may be utilized without departing from the spirit of the present invention. The four signals emanating from quadrant detector 51 are also combined in summing means 56 to produce a single return signal comprising a plurality of dithered signals each having a tagging dither frequency. This signal is coupled to COAT control electronics 54 which may include an amplifier, an envelope detector, a plurality of dither frequency oscillators, a plurality of band-pass filters to pass the respective dithering frequencies, and phase-sensitive detectors all arranged according to the system disclosed in U.S. Pat. No. 3,731,103 filed Feb. 24, 1971. Of course, it will be appreciated that COAT control 54 may be any control means which generates individual control signals to cause COAT phaser matrix 12 to impose phase shifts on the individual beams to compensate for distortions in the transmit path to target 58.

Commanded signals $I_x$ and $I_y$ may be formed from signals $I_a$, $I_b$, $I_c$ and $I_d$ according to the following equations wherein $$I_x = \frac{(I_a + I_b) - (I_c + I_d)}{I_D} = \frac{I_x'}{I_D}$$

$$I_y = \frac{(I_b + I_c) - (I_a + I_d)}{I_D} = \frac{I_y'}{I_D}$$

where $$I_D = I_a + I_b + I_c + I_d$$

The above equations may be implemented using the circuit shown in FIG. 4 where the x and y coordinate directions on quadrant detector 51 are indicated and where summing means 30, 31 and 34 combine to form $I_y'$, summing means 32, 33 and 36 combine to form $I_x'$, and summing means 35 in conjunction with summing means 32 and 33 combine to form denominator $I_D$. $I_y$ is then formed by dividing $I_y'$ by $I_D$ in divider 38 and $I_x$ is formed by dividing $I_x'$ by $I_D$ in divider 37. A representative means of accomplishing this summing process is also disclosed in U.S. Pat. No. 4,006,356, filed Oct. 27, 1961.

Although aperture control signal on lead 69 may be formed in a number of different ways, one representative way may be to compare the value of the command signal $I_x$ and $I_y$ against predetermined constants N and M. Thus, if signals $I_x$ and $I_y$ are sufficiently small so that slewing mirror 21 is being commanded to move only very slightly then it can be concluded that the maximum intensity glint in optical return signal 65 is falling on the center of quadrant detector 51. When the major glint has been centered according to the present invention, variable stop iris 50 is commanded to decrease its aperture to some optimum squeeze down circle which may be determined from the particular glint size or may be some preset aperture size. This logical test may be accomplished according to the representative implementation shown at FIG. 4 by comparator 39 which indicates a positive signal when $I_y$ is less than a predetermined number N, and gives a second positive signal from comparator 40 when $T_x$ is less than a preset number M. If the comparison from comparator 39 and comparator 40 are both simultaneously positive, then the output 69 from AND gate 41 will also be positive thereby commanding servo 70 to decrease the aperture of variable stop iris 50. Any other technique may be alternatively used so long as the iris is stopped down after the chosen glint has been substantially centered.

The operation of the imaging detector system illustrated by FIG. 3 can appreciably improve the lock-on stability of a multi-dither COAT system providing an automatic means for mitigating the glint jump problem. Thus, a variable stop iris 50 is placed in the optical energy return path in front of quadrant noncoherent detector 51 so that the light traveling through the variable stop iris aperture will be centered on detector 51.

Furthermore, variable stop iris 50 is preferably capable of being stopped down to an aperture size somewhat larger than the diffraction limited spot size of the receive aperture of telescope 15 in a transmitting COAT system. It will be noted that in a compensated imaging (I-COAT) augmentation, the variable stop iris may be advantageously stopped down to the defraction limited spot size. Quadrant detector 51 is then optically boresighted with the geometric axis of the pre-distorted output optical signal 59.

In operation, the output of the quadrant non-coherent detector 51 is processed to move the centroid of the image intensity distribution to the center of the detector (corresponding to the optical axis) by conventional circuitry driving either a repointing of the main beam director or as illustrated in FIG. 3, by driving a slewing mirror 21.

Figure 5A:
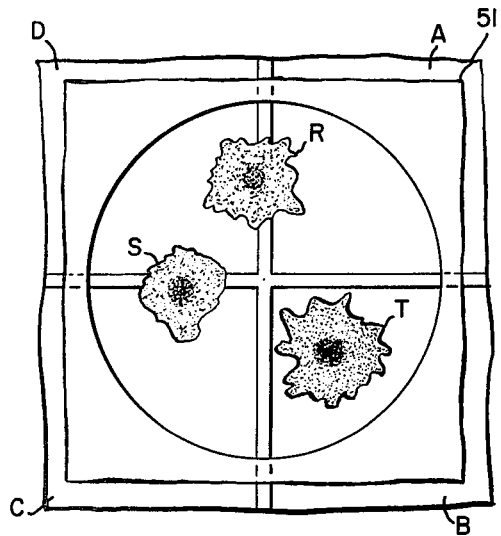
FIGS. 5a through 5d show a top view of a guadrant detector as seen through a variable stop iris illustrating the operation of the present invention.
Figure 5B:
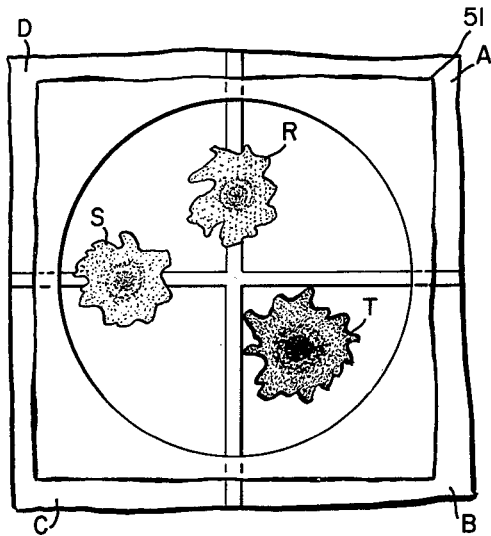
Figure 5C:
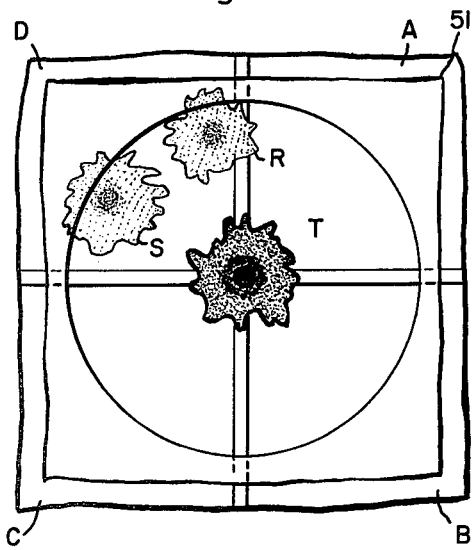

Referring now to FIG. 5a through 5d, there is shown a time evolvement sequence illustrating the operation of the present system. Assume that the initial position (FIG. 5a) occurs with the centroid of the optical return energy intensity centered on the detector. The glint images R, S and T are shown both as free space images (darker center regions) and as atmospherically disturbed images (surrounding larger areas), where for simplicity, the darkness indicates the optical return energy intensity. At the next illustrative time shown in FIG. 5b, a sufficient amount of time has passed for the COAT system to converge the transmitter beam on the strongest glint, i.e., glint T. This convergence on the strongest glint will typically occur within several milliseconds in existing system designs. The convergence process not only causes an even greater light intensity from the strongest glint but a weaker return light intensity from the weaker glints because they will be more weakly illuminated. The signals generated by the various quadrants, A, B, C and D, of quadrant detector 51 will thus be processed by control electronics 52 to produce an x command signal, $I_x$, and a y commandsignak, $I_y$, in accordance with the aforementioned equations to cause the centroid of the optical return energy image to shift in response to the quadrant detector redirecting the optical axis to essentially center the image of the dominant glint T as illustrated in FIG. 5c. This redirection of the optical return beam by slewing mirror 21 enhances the power on the glint with the dominant optical energy return. In addition, the movement of the dominant glint to the center of the detector 10 also enhances lock stability since the affective reflectivity from glint T will increase since more optical energy will be focused on glint T by the COAT system. In addition, less optical energy will fall on glints R & S to further increase the relative intensity of the return energy from glint T.

Figure 5D:
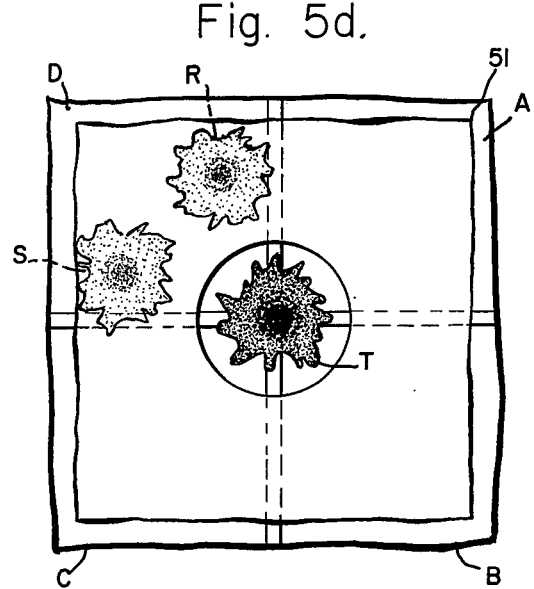

Finally from FIG. 5d, a means of sensing when the dominant glint has been centered is incorporated which in the present embodiment monitors the command signals $I_x$ and $I_y$ utilized to drive servo 22. If $I_x$ is less than the predefined number M and $I_y$ is less than the predefined number H, then the command signal 69 is sent to iris control servo 70 (FIG. 3) which causes the iris aperture to close down on the dominant glint T image such that the quadrant detector 51 is effectively decoupled from the other glints R and S. If, for example, the relative reflectivities of glints R and $T_x$ interchange, the COAT system will not jump, i.e., reconverge on glint R since increasing the relative power incident on glint R no longer increases the power incident on the detector.

The size of the aperture of the spatial filter (iris) 50 after it has closed down on the captured glint T will depend on a number of factors but will be selected to avoid transmitter beam aim point fluctuations which may be caused if the iris squeezes down too closely on the captured glint. This may occur since COAT systems compensate an image shift by moving the transmitter beam incident point to overcompensate the loss in reflectivity in terms of the delivery of reflected power to the detector. In addition, the iris must be capable of closing down to an aperture sufficiently small to block optical energy return from low intensity glints which could possibly become high intensity glints with time.

An alternative implementation of the invention is shown in FIG. 6 wherein summing means 56 is replaced by optical beam splitter 75 which splits part of incoming optical energy beam 65 to be incident on non-coherent detector 72 through a variable aperture iris whose aperture also decreases in response to the command servo 70 or may be a pinhole filter which becomes operable when the glint has been centered. Iris 71, detector 72 and beam splitter 75 combine and are aligned with variable stop iris 50 and quadrant detector 51 so that a glint centered on quadrant detector 51 will be centered on the aperture of iris 71. Non-coherent detector 72 will thus generate a signal on a lead 73 which is utilized by the COAT electronics to compensate for phase distortions in the transmission optical path. It will be appreciated that the specific embodiment shown in FIG. 6 corresponds to the block diagram of FIG. 1 previously discussed and that iris 71, detector 72 and beam splitter 75 combine to form COAT error signal detector 54.

Figure 7:
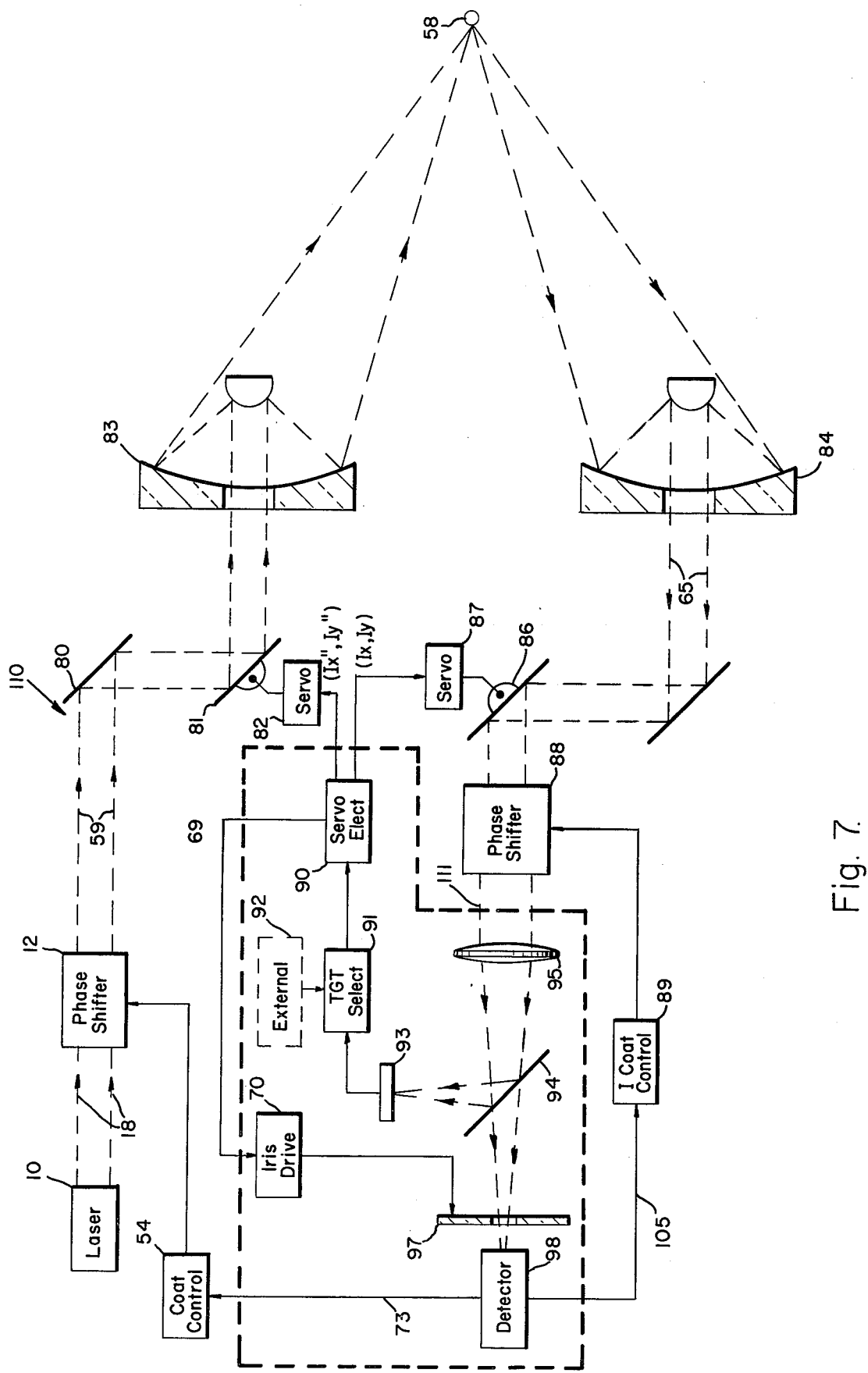
FIG. 7 is a block diagram illustrating the present invention in a dual aperture COAT system incorporating I-COAT processing.

The present invention may also be utilized in conjunction with an imaging COAT system such as that disclosed in U.S. Pat. No. 3,764,213 filed May 8, 1972. Thus, referring to FIG. 7, there is shown a representative COAT-Imaging COAT system 110 incorporating laser 10 which generates coherent optical energy 18. The plurality of beams are then predistorted in COAT phase shifter 12 to form predistorted wavefront 59 in accordance with coherent optical adaptive teachings. Predistorted wavefront 59 is then reflected from mirror 80 and pointing mirror 81 through transmitting telescope 83 to target 58. The coherent optical energy incident at target 58 will have a substantially uniform wavefront due to the predistortion imposed by phase shifters 12.

Optical return energy 65 is received by receive telescope 84 which is aligned to point in the same direction as transmit telescope 83. The optical return energy 65 is next reflected from fixed mirror 85 to pointing mirror 86. A plurality of phase shifters 88 which may also be a deformable mirror or other phase shifting device is interposed in the return path before lens 95 to allow compensation for distortions in the return optical path 65 in accordance with previously referenced I-COAT techniques to form compensated optical beam 111. Phase shifters 88 are controlled by I-COAT control 89 which may be disabled during the target select process to eliminate any possible confict between servo 87 commands and the phase shifting of I-COAT control 89. The compensated optical return energy 111 is focused on variable stop iris 97 through focusing means 95 where it impinges upon non-coherent optical detector 98. Optical detector 98 generates a composite signal 105 upon which I-COAT control 89 operates to establish the phase shift compensation imposed by phase shifters 88 on the optical return signal 65. Phase shifters 88, I-COAT control 89, detector 98, iris 97 and lens 95 may be implemented in accordance with the teaching of U.S. Pat. No. 3,764,213 filed May 8, 1972. Detector 98 may also be implemented to generate COAT signal on lead 73 upon which COAT control electronics 54 operates to generate signals for phase shifters 12 thereby impose conjugate predistortions to compensate for distortions in the transmission path 59.

In accordance with the present invention, one implementation utilizes beam splitter 94 to direct a portion of the compensated optical return beam 111 to detector means 93. Coupled to detector means 93 is target selection means 91 which surveys the images incident on detector 93 and selects a particular glint from the incident optical energy and generates signals to servo electronics 90 to command servo 87 coupled to pointing mirror 86 to point the incoming optical energy from the selected glint target to the center of detector 98 as viewed through the aperture of iris 97. Servo electronics 90 also generates command signals to servo 82 coupled to pointing mirror 81 to point pointing mirror 81 in such a way as to concentrate the transmitted coherent optical energy on the particular target glint selected.

Detector 93 and target select means 91 may be any arrangement whereby an object may be viewed and a particular aim point on that object selected so that the coherent optical beam may be concentrated on that aim point and the return energy centered on detector 98 as viewed through the aperture of iris 97.

Figure 9:
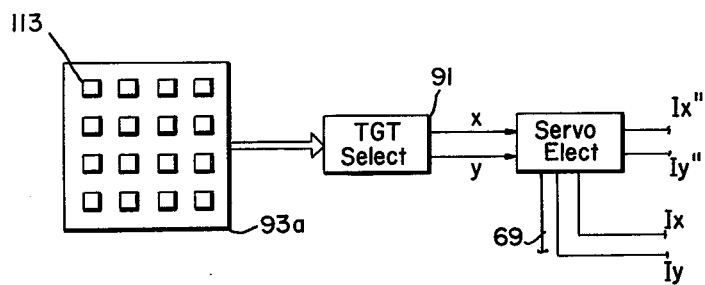
FIG. 9 is a partial block diagram-partial schematic of the system of FIG. 7 using a matrix optical detector rather than a quadrant detector.

One example of a detector and target select means combination is illustrated in FIG. 9 where detector 93a comprises a matrix of small non-coherent detectors 113 (the 4x4 matrix shown is illustrative only) arranged so that a particular detector may be identified by its x-y grid position in target select means 91. Target select means 91 may be any appropriate electronics to select a particular grid detector by its x-y grid address and based upon an alignment of detector 93a with the iris of optical filter 97 generate x and y position error signals indicating the amount of movement necessary to position the optical return incident on the selected matrix detector over the iris of filter 97. Servo electronics 90 then generates command signals $I_x$ and $I_y$ to direct pointing mirror 86 and will also generate signals $I_x''$ and $I_y''$ to command servo 82 to point pointing mirror 81.

The particular electronics and criteria for target selection incorporated in target select means 91 may be any appropriate or desirable aim point selection technique. For example, the detector in detector array 93a which has the highest intensity of incident light may be selected. Manual or external operation means 92 (FIG. 8) may also be incorporated by permitting an operator to select a particular point of the image incident on detector grid 93a whereupon target select means 91 will generate the appropriate x and y position signals. Such external target select means 92 may be incorporated as an addition to an automatic target select criteria.

Once directing mirrors 81 and 86 are positioned so that the selected aim point is centered on detector 98 as viewed through variable stop iris 97, servo electronics 90 generates command 69 in the manner previously discussed in conjunction with the explanation of FIG. 3. Command signal 69 causes iris aperture servo 70 to decrease the aperture of variable stop iris 97 as previously discussed to decouple the selected aim point from other glints in the return optical energy to thereby decrease the probability of glint jump.

Figure 8:
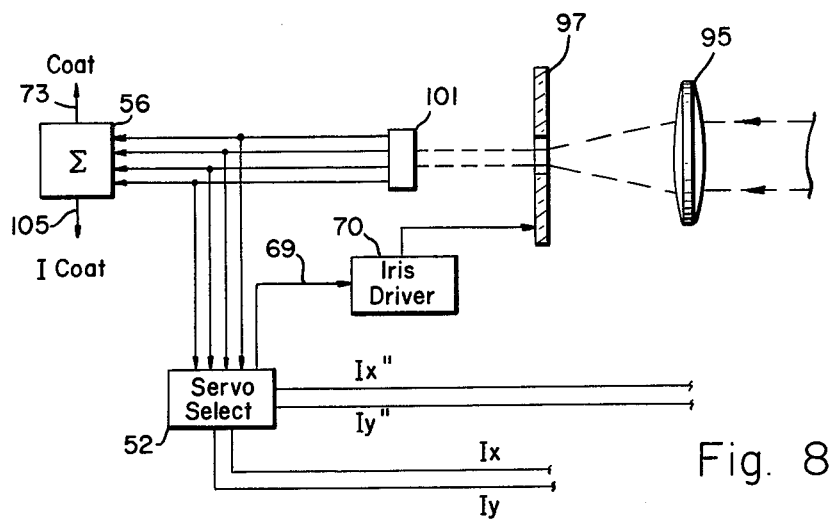
FIG. 8 is a partial block diagram illustrating an alternative embodiment of the invention as shown in FIG. 7.

An alternative mechanization of the present invention when used in conjunction with an imaging COAT system is disclosed in FIG. 8 wherein non-coherent optical detector 98 (FIG. 7) is replaced by quadrant detector 101 which provides four quadrant signals as described in conjunction with the system of FIG. 3. Servo control electronics 52a then generates the necessary directing mirror command signals $I_x''$, $I_y''$, and $I_x$ and $I_y$. The four quadrant signals from quadrant detector 101 are also combined in summing means 56 to generate COAT signal 73 and I-COAT signal 105 upon which the COAT and I-COAT systems operate as previously discussed. Servo electronics 52a also generates iris aperture command signal 69 in the manner previously discussed to command iris servo 70 to close the aperture of iris 97 when the selected aim point has been centered.

Figure 10:
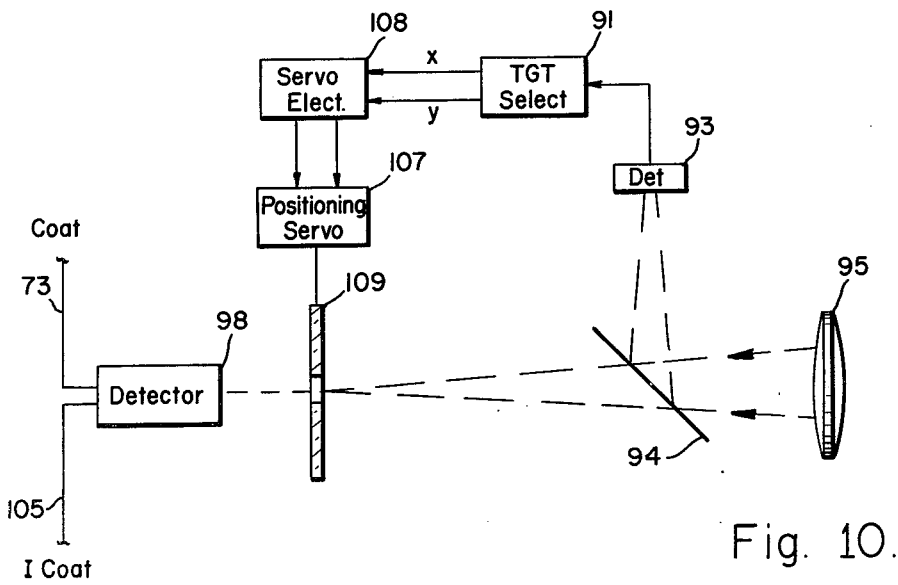
FIG. 10 is a partial block diagram of the system of FIG. 7 which uses a movable pinhole rather than a variable stop iris.

A final representative embodiment is illustrated by FIG. 10 wherein beam splitting element 94 directs a portion of the distortion corrected optical return energy 111 to detector 93 which may be a quadrant detector or a multi-detector array such as that illustrated by detector means 93 of FIG. 9. Target select means 91, such as that previously discussed in conjunction with FIG. 9, is coupled to detector means 93 to generate position signals x and y. Servo electronics 108 processes the position signals x and y and generates position commands $V_x$ and $V_y$ to spatial filter servo 107, which is mechanically coupled to the combination of non-coherent optical detector 98 and constant pinhole aperture spatial filter 109.

In operation, detector 93 is aligned with an x–y coordinate system on which spatial filter 109 and detector 98 may be mechanically mounted. Target select means 91 then selects a target and generates command signals x and y which are processed by servo electronics to generate command signals $V_x$ and $V_y$ to command pinhole servo 107 so that the pinhole and detector arrangement is physically moved to a position whereby the selected aim point is centered over the pinhole. In this particular embodiment, iris control means for decreasing the aperture of the variable stop iris as was done in prior embodiments is not necessary since the pinhole aperture of iris 109 has been preset to the appropriate aperture diameter. Detector 98 then generates the appropriate COAT signal 73 and the appropriate I-COAT signal 105.

It will be appreciated, of course, that various other implementations and arrangements to practice the present invention may be possible without departing from the spirit of the scope of the present invention. It will also be appreciated that iris aperture control means may also be provided with a command to increase the iris aperture to the maximum amount after a tracking sequence has been completed.

What is claimed is:

1. An adaptive optical system having means for transmitting optical energy to and for receiving optical energy from a target such that modulation signal components, derivable from the received energy beam and originating from energy from various discrete areas on the target, are indicative of the phasing across the beam at the target and said adaptive optical system further comprising phase control means which is responsive to said modulation signal components for adjusting the relative phase across the transmitted beam so as to cause the transmitted energy to approach an in-phase condition at the target, wherein the improvment comprises:

position determining means disposed in an optical path of the energy received from the target for providing beam position control signals indicative of the relative position of the centroid of the intensity of the optical energy in the received energy beam;

variable aperture means, interposed in an optical path of the received energy and including an adjustable aperture, for passing only that portion of the received energy beam applied thereto which is in alignment with said adjustable aperture;

phasing control detector means responsive to the received energy which passes through said adjustable aperture, for providing said modulation signal components to said phase control means;

position control means responsive to said position control signals for adjusting the spatial orientation between the received energy beam applied to said variable aperture means, and said variable aperture means, such that the centroid of the optical energy in said received beam is substantially centered within said aperture; and aperture control means, responsive to said position control signals, for reducing the size of said aperture when the centroid of the intensity of the optical energy in said received energy beam is substantially centered within said aperture;

whereby modulation signal components originating from areas on the target whose return energy is not in alignment with said adjustable aperture do not effect adaptive phase control of said transmitted beam.

2. The adaptive optical system of claim 1 wherein said position determining means includes a quadrant non-coherent detector, the center of which is disposed in alignment with the center of said aperture.

3. The adaptive optical system of claim 1 wherein said position control means includes drive motor means coupled to receive said position control signals and a slewing mirror coupled thereto, whereby said slewing mirror is directed in response to said position control signals applied to said drive motor means.

4. The adaptive optical system of claim 1 wherein said aperture control means includes means for reducing the size of said aperture when said position control signals are less than preselected values.

5. The adaptive optical system of claim 4 wherein said variable aperture, in its reduced size configuration, blocks received energy from all but approximately one target area of high reflectivity.

6. The adaptive optical system of claim 4 wherein said variable aperture, in its reduced size configuration, blocks received energy from all but approximately one target area of low reflectivity.

7. An adaptive optical system having means for processing received optical energy such that modulation signal components, derivable from the processed received energy and originating from energy from various discrete areas across the received beam, are indicative of the phasing across the received energy beam, and said adaptive optical system further comprising phase control means which is responsive to said modulation signal components for adjusting the relative phase across the received beam so as to cause the energy in the adjusted received beam to approach an in-phase condition, wherein the improvement comprises:

position determining means disposed in an optical path of the received energy for providing beam position control signals indicative of the relative position of the centroid of the intensity of the optical energy in the received energy beam;

variable aperture means, interposed in an optical path of the received energy and including an adjustable aperture, for passing only that portion of the received energy beam applied thereto which is in alignment with said adjustable aperture;

phasing control detector means responsive to the received energy which passes through said adjustable aperture, for providing said modulation signal components to said phase correction means;

position control means responsive to said position control signals for adjusting the spatial orientation between the received energy beam applied to said variable aperture means, and said variable aperture means, such that the centroid of the optical energy in said received beam is substantially centered within said aperture; and aperture control means, responsive to said position control signals, for reducing the size of said aperture when the centroid of the intensity of the optical energy in said received energy beam is substantially centered within said aperture;

whereby modulation signal components originating from areas across the received beam whose return energy is not in alignment with said adjustable aperture do not effect the adaptive phase control of said adjusted received beam.

8. The adaptive optical system of claim 7 wherein said position determining means includes a quadrant non-coherent detector, the center of which is disposed in alignment with the center of said aperture.

9. The adaptive optical system of claim 7 wherein said position control means includes drive motor means coupled to receive said position control signals and a slewing mirror coupled thereto, whereby said slewing mirror is directed in response to position control signals applied to said drive motor means.

10. The adaptive optical system of claim 7 wherein said aperture control means includes means for reducing the size of said aperture when said position control signals are less than preselected values.

11. The adaptive optical system of claim 10 wherein said variable aperture, in its reduced size configuration, blocks received energy from all but approximately one area of high reflectivity in said received beam.

12. The adaptive optical system of claim 10 wherein said variable aperture, in its reduced size configuration, blocks received energy from all but approximately one area of low reflectivity in said received beam.

* * * * *